US012775820B2

(12) United States Patent
Guo et al.

(10) Patent No.: US 12,775,820 B2
(45) Date of Patent: Oct. 27, 2026

(54) OPTIMIZING METHOD AND COMPUTING APPARATUS FOR DEEP LEARNING NETWORK AND COMPUTER-READABLE STORAGE MEDIUM

(71) Applicant: Wistron Corporation, New Taipei City (TW)

(72) Inventors: Jiun-In Guo, Hsinchu (TW); Po-Yuan Chen, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 1018 days.

(21) Appl. No.: 17/950,119

(22) Filed: Sep. 22, 2022

(65) Prior Publication Data

US 2023/0385600 A1 Nov. 30, 2023

(30) Foreign Application Priority Data

May 26, 2022 (TW) .................................. 111119653

(51) Int. Cl.
*G06N 3/04* (2023.01)

(52) U.S. Cl.
CPC ...................................... *G06N 3/04* (2013.01)

(58) Field of Classification Search
CPC ............................... G06N 3/04; G06N 3/0495
See application file for complete search history.

(56) References Cited

U.S. PATENT DOCUMENTS 11,403,528 B2 8/2022 Xie et al.
11,775,611 B2 10/2023 Fang et al.
2019/0042948 A1* 2/2019 Lee ..................... G06F 7/49947
2019/0095777 A1* 3/2019 Kim ......................... G06N 3/08
2019/0138882 A1* 5/2019 Choi ...................... G06N 3/048
(Continued)

FOREIGN PATENT DOCUMENTS

CN 110826692 2/2020
JP 2021056734 4/2021
(Continued)

OTHER PUBLICATIONS

"Office Action of Taiwan Counterpart Application", issued on Apr. 24, 2023, p. 1-p. 6.
(Continued)

*Primary Examiner* — Reji Kartholy
(74) *Attorney, Agent, or Firm* — JCIPRNET

(57) ABSTRACT

An optimizing method and a computing apparatus for a deep learning network and a computer-readable storage medium are provided. In the method, a value distribution is obtained from a pre-trained model. One or more breaking points in a range of the value distribution are determined. Quantization is performed on a part of values of a parameter type in a first section among multiple sections using a first quantization parameter and the other part of values of the parameter type in a second section among the sections using a second quantization parameter. The value distribution is a statistical distribution of values of the parameter type in the deep learning network. The range is divided into the sections by one or more breaking points. The first quantization parameter is different from the second quantization parameter. Accordingly, accuracy drop can be reduced.

16 Claims, 9 Drawing Sheets

(56) References Cited

U.S. PATENT DOCUMENTS

| | | | | |
|---|---|---|---|---|
| 2019/0370658 | A1 | 12/2019 | Xie et al. | |
| 2020/0026986 | A1* | 1/2020 | Ha | G06N 3/04 |
| 2020/0218982 | A1* | 7/2020 | Annau | G06N 3/063 |
| 2021/0097397 | A1 | 4/2021 | Sakai | |
| 2021/0133278 | A1* | 5/2021 | Fang | G06N 3/08 |
| 2022/0114455 | A1* | 4/2022 | Samek | G06N 3/084 |
| 2022/0284260 | A1* | 9/2022 | Patel | G06N 3/0495 |
| 2023/0214639 | A1* | 7/2023 | Hanumante | G06V 10/82 706/19 |
| 2024/0144944 | A1* | 5/2024 | Dieleman | G10L 25/30 |

FOREIGN PATENT DOCUMENTS

| | | |
|---|---|---|
| JP | 2021072103 | 5/2021 |
| TW | I722434 | 3/2021 |

OTHER PUBLICATIONS

Angela Fan et al., "Training with Quantization Noise for Extreme Model Compression", retrieved from arXiv database, arXiv:2004.07320v3 [cs.LG], Feb. 28, 2021, pp. 1-20.

"Office Action of Japan Counterpart Application", issued on Oct. 17, 2023, p. 1-p. 3.

"Search Report of Europe Counterpart Application", issued on Oct. 23, 2023, p. 1-p. 9.

Chia-Chi Tsai et al., "IVS-Caffe—Hardware-Oriented Neural Network Model Development", IEEE Transactions on Neural Networks and Learning Systems, Mar. 2021, pp. 1-15.

Philipp Gysel et al., "Ristretto: A Framework for Empirical Study of Resource-Efficient Inference in Convolutional Neural Networks", IEEE Transactions on Neural Networks and Learning Systems, Nov. 2018, pp. 5784-5789.

* cited by examiner

OPTIMIZING METHOD AND COMPUTING APPARATUS FOR DEEP LEARNING NETWORK AND COMPUTER-READABLE STORAGE MEDIUM

CROSS-REFERENCE TO RELATED APPLICATION

This application claims the priority benefit of Taiwan application serial no. 111119653, filed on May 26, 2022. The entirety of the above-mentioned patent application is hereby incorporated by reference herein and made a part of this specification.

BACKGROUND

Technical Field

The disclosure relates to a machine learning technology, and more particularly to an optimizing method and a computing apparatus for a deep learning network and a computer-readable storage medium.

Description of Related Art

In recent years, with the increasing updating of artificial intelligence (AI) technology, the number of parameters and computational complexity of neural network models are also increasing. As a result, compression technology for deep learning networks have also flourished. It is worth noting that quantization is an important technique for compressing models. However, prediction accuracy and compression rate of conventional quantized models still need to be improved.

SUMMARY

The disclosure provides an optimizing method and a computing apparatus for a deep learning network and a computer-readable storage medium, which can ensure prediction accuracy and compression rate using multi-scale dynamic quantization.

An optimizing method for a deep learning network according to an embodiment of the disclosure includes (but is not limited to) the following steps. A value distribution is obtained from a pre-trained model. One or more breaking points in a range of the value distribution is determined. Quantization is performed on a part of the values of a parameter type in a first section among multiple sections using a first quantization parameter and the other part of values of the parameter type in a second section among the sections using a second quantization parameter. The value distribution is a statistical distribution of values of the parameter type in the deep learning network. The the range is divided into the sections by one or more breaking points. The first quantization parameter is different from the second quantization parameter.

A computing apparatus for a deep learning network according to the embodiment of the disclosure includes (but is not limited to) a memory and a processor. The memory is used for storing a code. The processor is coupled to the memory. The processor loads and executes the code to obtain a value distribution from a pre-trained model, determine one or more breaking points in a range of the value distribution, and perform quantization on a part of the values of a parameter type in a first section among multiple sections using a first quantization parameter and the other part of the values of the parameter in a second section among the sections using a second quantization parameter. The value distribution is a statistical distribution of values of the parameter type in the deep learning network. The range is divided into the sections by one or more breaking points. The first quantization parameter is different from the second quantization parameter.

A non-transitory computer-readable storage medium of the embodiment of the disclosure is used to store a code. A processor loads the code to execute the following steps. A value distribution is obtained from a pre-trained model. One or more breaking points in a range of the value distribution is determined. Quantization is performed on a part of the values of a parameter type in a first section among multiple sections using a first quantization parameter and the other part of values of the parameter type in a second section among the sections using a second quantization parameter. The value distribution is a statistical distribution of values of the parameter type in the deep learning network. The range is divided into the sections by one or more breaking points. The first quantization parameter is different from the second quantization parameter.

Based on the above, according to the optimizing method and the computing apparatus for the deep learning network and the computer-readable storage medium, the value distribution is divided into the sections according to the breaking points, and different quantization parameters are respectively used for the values of the sections. In this way, the quantized distribution can more closely approximate the original value distribution, thereby improving prediction accuracy of a model.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
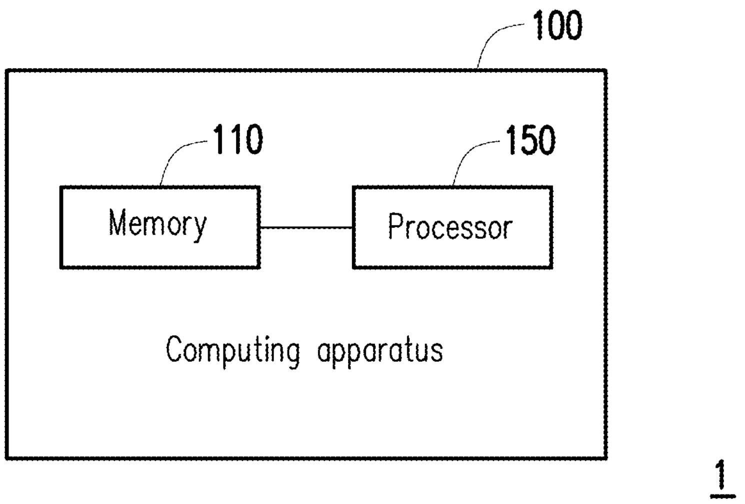
FIG. 1 is a block diagram of elements of a computing apparatus according to an embodiment of the disclosure.

FIG. 1 is a block diagram of elements of a computing apparatus 100 according to an embodiment of the disclosure. Please refer to FIG. 1. The computing apparatus 100 includes (but is not limited to) a memory 110 and a processor 150. The computing apparatus 100 may be a desktop computer, a notebook computer, a smart phone, a tablet computer, a server, or other electronic apparatuses.

The memory 110 may be any type of fixed or removable random access memory (RAM), read only memory (ROM), flash memory, traditional hard disk drive (HDD), solid state drive (SSD), or similar elements. In an embodiment, the memory 110 is used to store a code, a software module, a configuration, data, or a file (for example, a sample, a model parameter, a value distribution, or a breaking point).

The processor 150 is coupled to the memory 110. The processor 150 may be a central processing unit (CPU), a graphics processing unit (GPU), other programmable general-purpose or specific-purpose microprocessors, digital signal processors (DSPs), programmable controllers, field programmable gate arrays (FPGAs), application-specific integrated circuits (ASICs), neural network accelerators, other similar elements, or a combination of the foregoing elements. In an embodiment, the processor 150 is used to execute all or part of the operations of the computing apparatus 100 and may load and execute each code, software module, file, and data stored in the memory 110.

Hereinafter, the method according to the embodiment of the disclosure will be described in conjunction with various devices, elements, and modules in the computing apparatus 100. Each process of the method may be adjusted according to the implementation situation and is not limited thereto.

Figure 2:
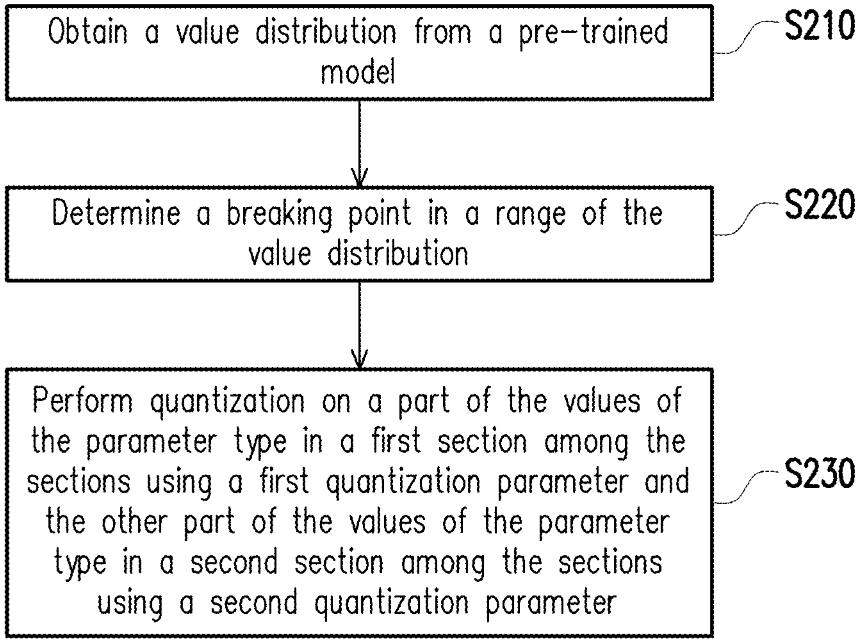
FIG. 2 is a flowchart of an optimizing method for a deep learning network according to an embodiment of the disclosure.

FIG. 2 is a flowchart of an optimizing method for a deep learning network according to an embodiment of the disclosure. Please refer to FIG. 2. The processor 150 obtains one or more value distributions from a pre-trained model (Step S210). Specifically, the pre-trained model is based on a deep learning network (for example, you only look once (YOLO), AlexNet, ResNet, region based convolutional neural networks (R-CNN), or fast R-CNN). In other words, the pre-trained model is a model trained by inputting training samples into the deep learning network. It should be noted that the pre-trained model may be used for image classification, object detection, or other inferences, and the embodiment of the disclosure does not limit the use thereof. The pre-trained model that has been trained may meet preset accuracy criteria.

It is worth noting that the pre-trained model has a corresponding parameter (for example, a weight, an input/output activation/feature value) at each layer. It is conceivable that too many parameters will require higher computing and storage requirements, and higher complexity of the parameters will increase the amount of computation. Quantization is one of the techniques for reducing the complexity of a neural network. Quantization can reduce the number of bits for representing the activation/feature value or the weight. There are many types of quantization methods, such as symmetric quantization, asymmetric quantization, and clipping methods.

Figure 3:
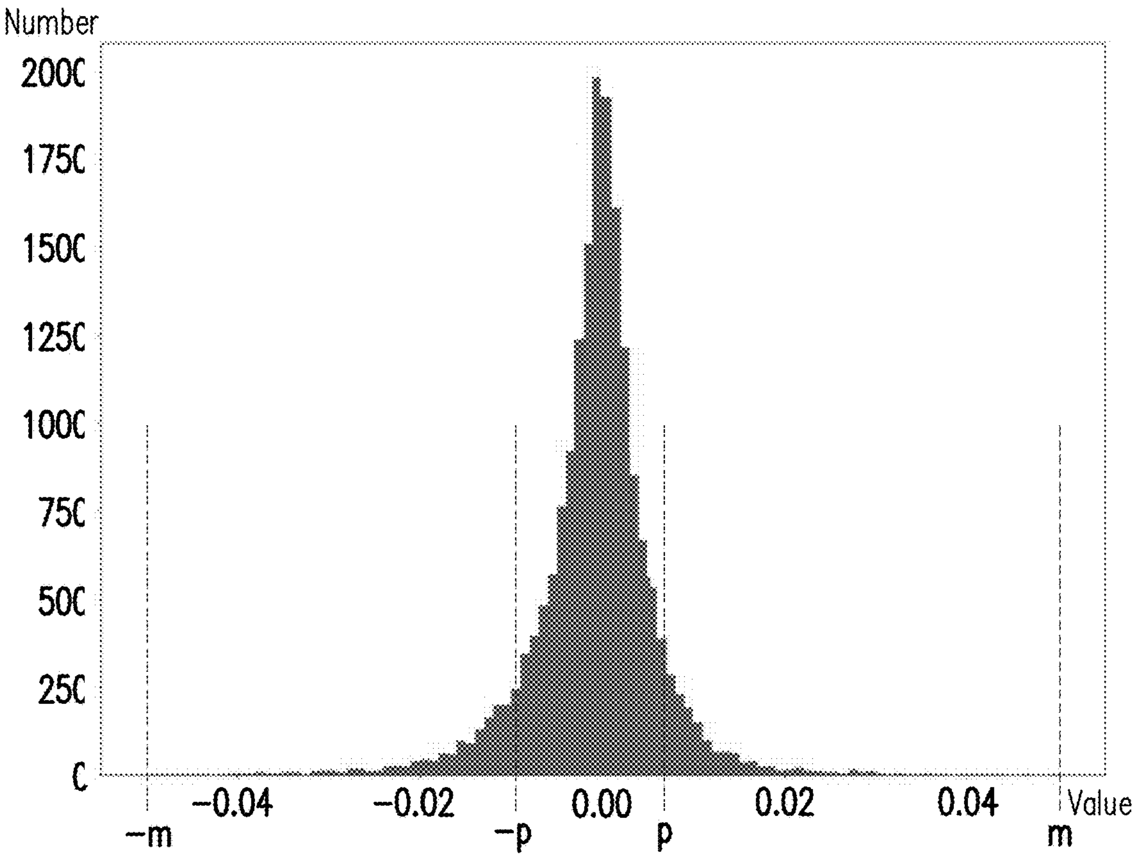
FIG. 3 is a schematic diagram of a value distribution according to an embodiment of the disclosure.

On the other hand, a value distribution is a statistical distribution of multiple values of one or more parameter types in a deep learning network. The parameter type may be a weight, an input activation/feature value, and/or an output activation/feature value. The statistical distribution expresses the distribution of a statistic (for example, a total number) of each value. For example, FIG. 3 is a schematic diagram of a value distribution according to an embodiment of the disclosure. Please refer to FIG. 3. A value distribution of weights or input/output activation/feature values in the pre-trained model is similar to a Gaussian, Laplacian, or bell-shaped distribution. It is worth noting that as shown in FIG. 3, most of the values are located in a middle section of the value distribution. If uniform quantization is used for the values, the values in the middle section may all be quantized to zero, and accuracy of model prediction may be reduced. Therefore, quantization needs to be improved for the values of the parameter type for the deep learning network.

In an embodiment, the processor 150 may generate the value distribution using verification data. For example, the processor 150 may perform inference on the verification data through a pre-trained floating-point model (that is, the pre-trained model), collect the parameter (for example, the weight, the input activation/feature value, or the output activation/feature value) of each layer, and count the values of the parameter type to generate the value distribution of the parameter type.

Please refer to FIG. 2. The processor 150 determines one or more breaking points in a range of the value distribution (Step S220). Specifically, as shown in FIG. 3, the total number of values in different sections may vary greatly. For example, the total number of the values of the middle section is significantly greater than the total number of values of two end/tail sections. Instead, the breaking points are used to divide the range into multiple sections. That is, the range is divided into multiple sections by one or more breaking points. For example, a breaking point p (real number) in a value domain in FIG. 3 divides the value distribution in a range [−m, m] into two symmetrical sections, where m (real number) represents the maximum absolute value in the range of the value distribution. The two symmetrical sections include a middle section and tail sections. The middle section is in a range [−p, p], and the tail sections are other sections in the range [−m, m].

Taking FIG. 3 as an example and assuming that the values are floating points, if the range is divided into the middle section and the tail sections, the values of the middle section may need a greater bit width to represent the fractional part, so as to prevent too many values from being quantized to zero. Also, for the tail section, a greater bit width may be required to represent the integer part, so as to provide enough power to quantize greater values. From this, it can be seen that the breaking points are the basis for classifying the values into different quantization requirements. Also, finding suitable breaking points for the value distribution helps with quantization.

Figure 4:
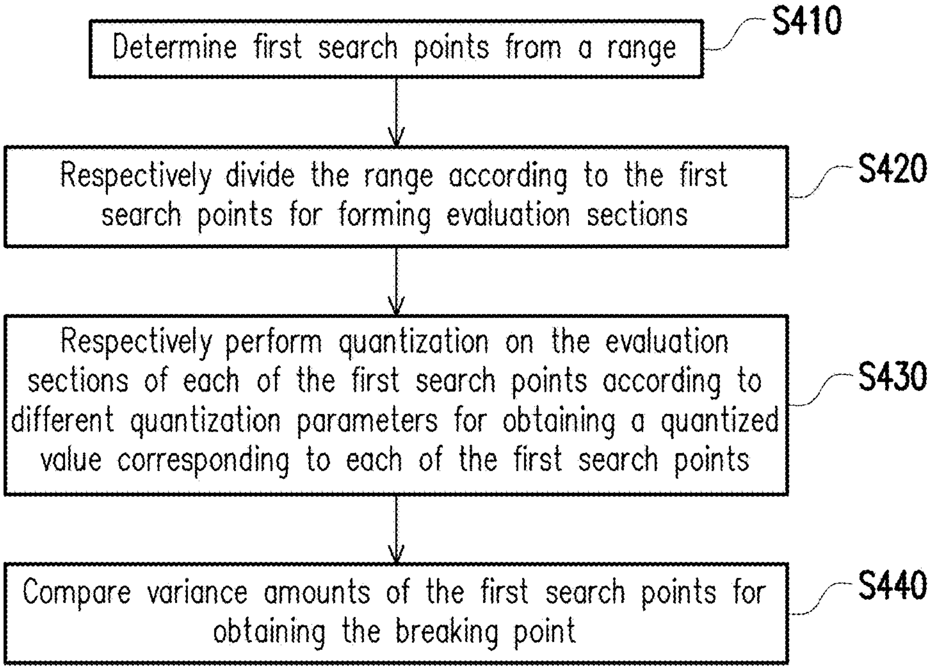
FIG. 4 is a flowchart of a breaking point search according to an embodiment of the disclosure.

FIG. 4 is a flowchart of a breaking point search according to an embodiment of the disclosure. Please refer to FIG. 4. The processor 150 may determine multiple first search points from the range of the value distribution (Step S410). The first search points are used to evaluate whether there is any breaking point. The first search points are located in the range. In an embodiment, the distance between any two adjacent first search points is the same as the distance between other two adjacent first search points. In other embodiments, the distances between adjacent first search points may be different.

The processor 150 may respectively divide the range according to the first search points for forming multiple evaluation sections (Step S420), and each evaluation sections is corresponding to each first search points. In other words, any search point divides the range into the evaluation sections or any evaluation section is located between two adjacent first search points. In an embodiment, the processor 150 may determine a first search space in the range of the value distribution. The first search point may divide the first search space into the evaluation sections. The processor 150 may define the first search space and the first search point using a breaking point ratio. Multiple breaking point ratios are respectively the ratios of the first search points to the maximum absolute value in the value distribution, and Mathematical Expression (1) is:

breakpoint ratio=break point/abs max (1)

where breakpoint ratio is the breaking point ratio, break point is any first search point or other search points or breaking points, and abs max is the maximum absolute value in the value distribution. For example, the first search space is [0.1, 0.9] and the distance is 0.1. In other words, the breaking point ratios of the first search points are respectively 0.1, 0.2, 0.3, etc., and so on up to 0.9, and the first search points may be backtracked according to a mathematical expression.

The processor 150 may respectively perform quantization on the evaluation sections of each first search point according to different quantization parameters for obtaining a quantized value corresponding to each first search point (Step S430). In other words, different quantization parameters are used for different evaluation sections of any one search point. Taking dynamic fixed-point quantization as an example, the quantization parameter includes a bit width (BW), an integer length (IL), and a fraction length (FL). The different quantization parameters are, for example, different integer lengths and/or different fraction lengths. It should be noted that the quantization parameters used by different quantization methods may be different. In an embodiment, under the same bit width, the fraction length used by a section with a value close to zero is longer, and the integer length used by a section with a greater value is longer.

The processor 150 may compare multiple variance amounts of the first search points for obtaining one or more breaking points (Step S440). Each variance amount corresponding to the first search point includes the variance between the quantized value and the corresponding unquantized value (that is, the value before quantization). For example, the variance amount is mean squared error (MSE), root mean squared error (RMSE), or mean absolute error. Taking MSE as an example, Mathematical Expression (2) is as follows:

$$MSE = \frac{1}{n}\sum_{i=1}^{n} h(x_i) * (x_i - Q(x_i))^2 \quad (2)$$

where MSE is the variance amount calculated by MSE, $x_i$ is the (unquantized) value (for example, a weight or an input/output activation/feature value), $Q(x_i)$ is the quantized value, h( ) is a constant, and n is the total number of the values. Taking symmetrical quantization for the quantized value as an example, and Equations (3) and (4) are as follows:

$$x_{quantized} = \frac{x_{float}}{x_{scale}} \quad (3)$$

$$x_{scale} = \frac{x_{float}^{max} - x_{float}^{min}}{x_{quantized}^{max} - x_{quantized}^{min}} \quad (4)$$

where $x_{quantized}$ is the quantized value, $x_{float}$ is the value of a floating point (that is, the unquantized value), $x_{scale}$ is the quantization level scale, $$x_{float}^{max}$$

is the maximum value in the value distribution, $$x_{float}^{min}$$

is the minimum value in the value distribution, $$x_{quantized}^{max}$$

is the maximum value among the quantized values, and $$x_{quantized}^{min}$$

is the minimum value among the quantized values.

In an embodiment, the processor 150 may use one or more of the first search points with smaller variance amounts as one or more breaking points. Smaller variance amount means its variance amount is smaller than others. Taking one breaking point as an example, the processor 150 may select one of the first search points with the small variance amount as the breaking point. Taking two breaking points as an example, the processor 150 selects two of the first search points with the small variance amount and the second small variance amount as the breaking points.

Figure 5:
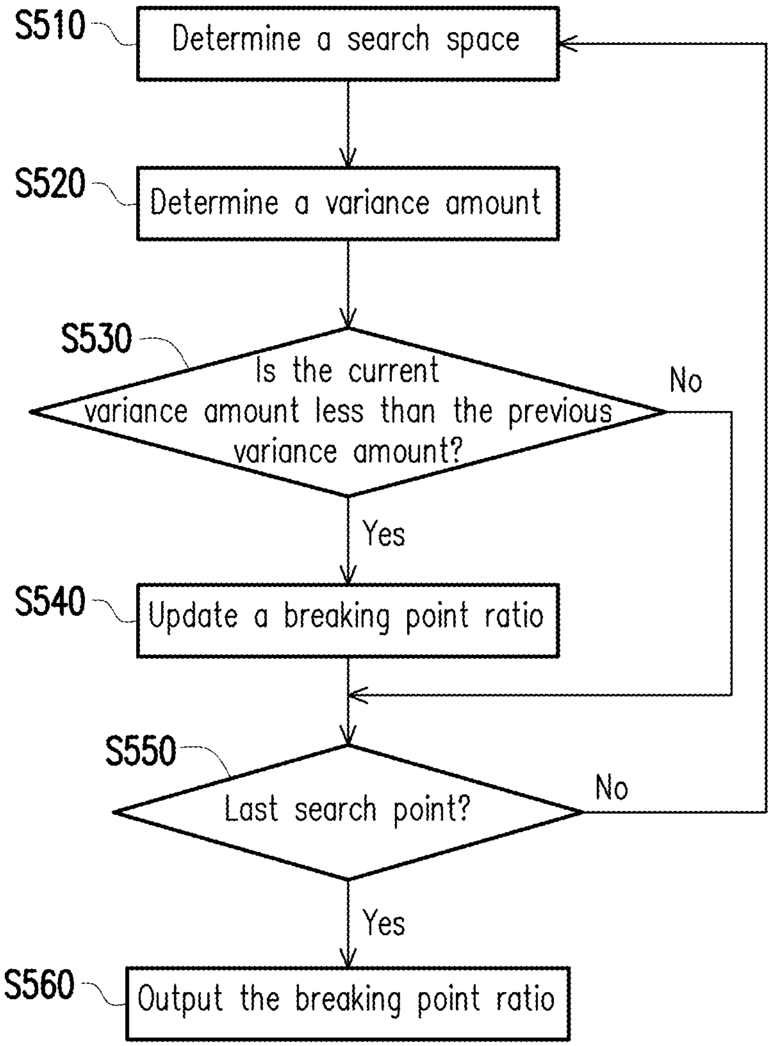
FIG. 5 is a flowchart of a breaking point search according to an embodiment of the disclosure.

Taking selecting the small variance amount as an example, FIG. 5 is a flowchart of a breaking point search according to an embodiment of the disclosure. Please refer to FIG. 5. The processor 150 may determine a search space and obtain a quantized value of a current first search point (Step S510). For example, the maximum value and the minimum value in the value distribution are used as the upper limit and the bottom limit of the search space. In addition, quantization is performed on the two sections divided by the first search point using different quantization parameters. The processor 150 may determine a variance amount, such as the mean squared error of a quantized value and an unquantized value, of the current first search point (Step S520). The processor 150 may determine whether the variance amount of the current first search point is less than a previous variance amount (Step S530). The previous variance amount is a variance amount of another first search point calculated the previous time. If the current variance amount is less than the previous variance amount, the processor 150 may update a breaking point ratio using the current first search point (Step S540). For example, the breaking point ratio may be obtained by substituting the first search point into Mathematical Expression (1). If the current variance amount is not less than the previous variance amount, the processor 150 may disable/ignore/not update the breaking point ratio. Next, the processor 150 may determine whether the current first search point is the last search point in the search space (Step S550), that is, ensure that the variance amounts of all the first search points are compared. If there are other variance amounts of the first search points that are not compared, the processor 150 may determine a quantized value of a next first search point (Step S510). If the first search points are all compared, the processor 150 may output the final breaking point ratio, and determine the breaking point according to the breaking point ratio (Step S560).

Figure 6:
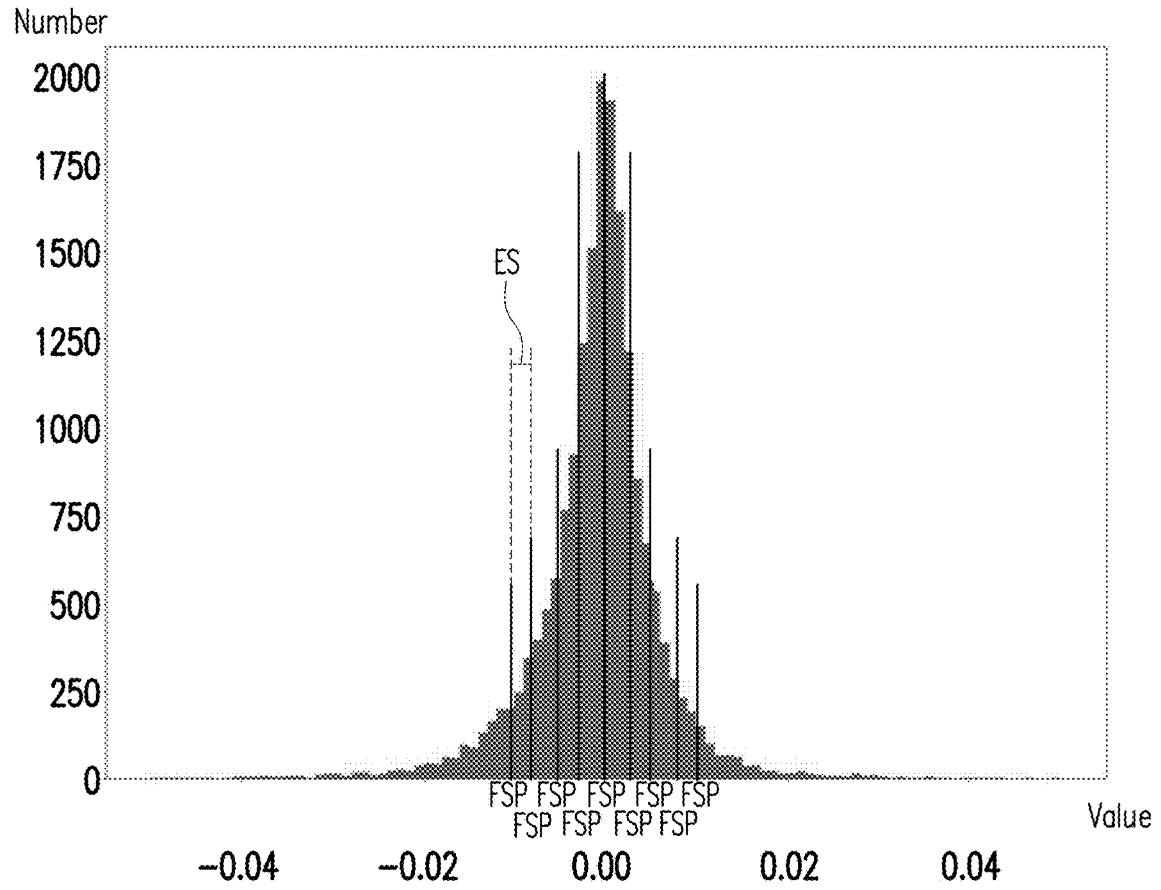
FIG. 6 is a schematic diagram of a first stage search according to an embodiment of the disclosure.

FIG. 6 is a schematic diagram of a first stage search according to an embodiment of the disclosure. Please refer to FIG. 6. There is a distance ES between adjacent two of multiple first search points FSP. In an embodiment, the first stage search may be used as a cursory search, and a second stage of fine search may be additionally provided. For example, the second stage defines a second search point, and a distance between two adjacent second search points is less than the distance between two adjacent first search points. The second search points are also used to evaluate whether there is any breaking point, and the second search points are located in the range of the value distribution.

In an embodiment, the processor 150 may determine a second search space according to one or more of the first search points with smaller variance amounts. The second search space is less than the first search space. Defined by the breaking point ratio, in an embodiment, the processor 150 may determine the breaking point ratio according to one of the first search points with the small variance amount. The breaking point ratio is the ratio of the first search point with the small variance amount to maximum absolute value in the value distribution, and reference may be made to the relevant description of Mathematical Expression (1), which will not be repeated here. The processor 150 may determine the second search space according to the breaking point ratio. The small variance amount may be located in the middle of the second search space. For example, if the breaking point ratio is 0.5, the range of the second search space may be [0.4, 0.6], and the distance between two adjacent second search points may be 0.01 (assuming that the distance between the first search points is 0.1). It should be noted that the breaking point ratio of with the small variance amount in the first stage is not limited to being located in the middle of the second search space.

Figure 7:
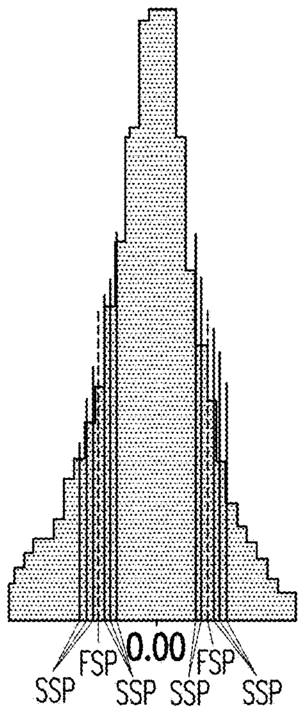
FIG. 7 is a schematic diagram of a second stage search according to an embodiment of the disclosure.

FIG. 7 is a schematic diagram of a second stage search according to an embodiment of the disclosure. Please refer to FIG. 7, which is a partial enlarged view of the value distribution. Compared with FIG. 6, a distance between two adjacent second search points SSP in FIG. 7 is significantly less than the distance ES in FIG. 6. In addition, the second search space is equally divided by the second search points SSP, and divide multiple corresponding evaluation sections accordingly.

Similarly, for the second stage, the processor 150 may perform quantization on values of evaluation sections divided by each second search point using different quantization parameters to obtain a quantized value corresponding to each second search point. Next, the processor 150 may compare multiple variance amounts of the second search points for obtaining one or more breaking points. Each variance amount corresponding to the second search point includes the variance between the quantized value and the corresponding unquantized value. For example, the variance amount is MSE, RMSE, or MAE. Additionally, the processor 150 may use one or more of the second search points with smaller variance amounts as one or more breaking points. Taking one breaking point as an example, the processor 150 may select one of the second search points with the small variance amount as the breaking point.

Figure 8:
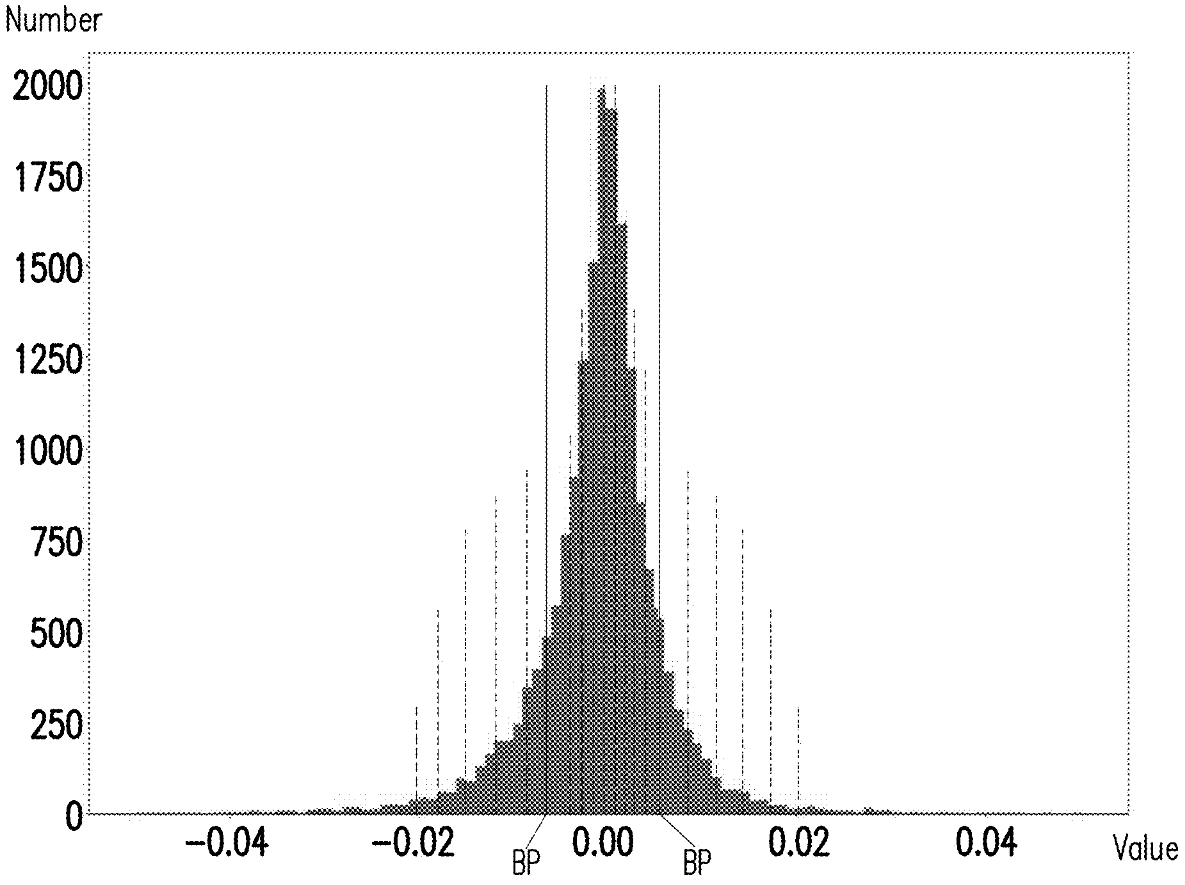
FIG. 8 is a schematic diagram of multi-scale dynamic fixed-point quantization according to an embodiment of the disclosure.

Please refer to FIG. 2. The processor 150 performs quantization on a part of the values of the parameter type in the first section among the sections using the first quantization parameter and the other part of values of the parameter type in the second section among the sections using the second quantization parameter (Step S230). Specifically, as described in Step S220, the breaking point is used to divide sections with different quantization requirements in the value distribution. Therefore, the embodiment of the disclosure provides different quantization parameters for different sections. For example, FIG. 8 is a schematic diagram of multi-scale dynamic fixed-point quantization according to an embodiment of the disclosure. Please refer to FIG. 8. A pair of breaking points BP divides the value distribution into a middle section and tail sections. The dotted line represents a schematic line for quantizing a quantization parameter, values in the middle section are denser, values in the tail section are more scattered, and quantization is performed on the two sections using different quantization parameters.

Figure 9:
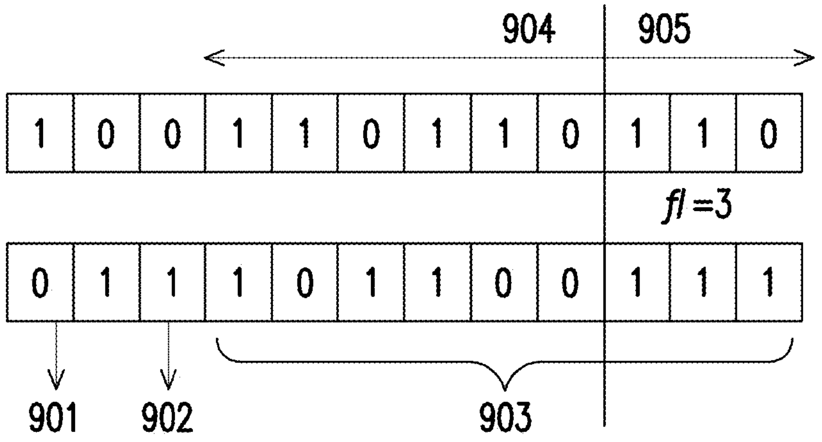
FIG. 9 is a schematic diagram of a quantization parameter according to an embodiment of the disclosure.

For the middle section where the value distribution is denser, the processor 150 may assign a greater bit width to the fraction length (FL); and for the tail section where the value distribution is more scattered, the processor 150 may assign a greater bit width to the integer length (IL). FIG. 9 is a schematic diagram of a quantization parameter according to an embodiment of the disclosure. Please refer to FIG. 9. Taking dynamic fixed-point quantization as an example, among 12 bits representing a value, in addition to an extra bit 901 and a sign bit 902, a mantissa 903 includes an integer part 904 and a fractional part 905. If the fraction length is 3 (that is, fl=3), the fractional part 905 occupies three bits as shown in the drawing. In some application scenarios, dynamic fixed-point quantization is more suitable for hardware implementation than asymmetric quantization. For example, in addition to an adder and a multiplier, a neural network accelerator only needs additional support for translation computation. However, in other embodiments, asymmetric quantization or other quantization methods may also be adopted.

It should also be noted that if more than two breaking points are obtained, it is not limited to applying two quantization parameters to different sections.

In an embodiment, the processor 150 may perform dynamic fixed-point quantization combined with a clipping method. The processor 150 may determine the integer length of the first quantization parameter, the second quantization parameter, or other quantization parameters according to the maximum absolute value and the minimum absolute value in the value distribution. The clipping method takes percentile clipping as an example. There are very few values far from the middle in the bell-shaped distribution shown in FIG. 3, and percentile clipping can alleviate the influence of the off-peak values. The processor 150 may use the value located at 99.99 percentile in the value distribution as a maximum $W_{max}$, and use the value located at 0.01 percentile in the value distribution as a minimum $W_{min}$. The processor 150 may determine, for example, an integer length $IL_W$ of the weight according to Equation (5):

$$IL_W = \log_2(\max(|W_{max}|, |W_{min}|)) + 1 \quad (5)$$

It should be noted that the maximum and the minimum are not limited to the 99.99% and 0.01%, quantization is not limited to being combined with percentile clipping, and the quantization method is not limited to dynamic fixed-point quantization. Additionally, input activation/feature values, output activation/feature values, or other parameter types may also be applicable. Taking an absolute maximum value as an example, the processor 150 may use a part of the training samples as calibration samples, and infer the calibration samples to obtain the value distribution of activation/feature values. The maximum in the value distribution may be used as the maximum for the clipping method. Also, Equation (5) may determine, for example, the integer length of the input/output activation/feature value:

$$IL_I=\log_2(\max(|I_{max}|,|I_{min}|))+1 \tag{6}$$

$$IL_O=\log_2(\max(|O_{max}|,|O_{min}|))+1 \tag{7}$$

where $IL_I$ is the integer length of the input activation/feature value, $IL_O$ is the integer length of the output activation/feature value, $I_{max}$ is the maximum in the value distribution of the input activation/feature values, $O_{max}$ is the maximum in the value distribution of the output activation/feature values, $I_{min}$ is the minimum in the value distribution of the input activation/feature values, and $O_{min}$ is the minimum in the value distribution of the output activation/feature values.

Figure 10:
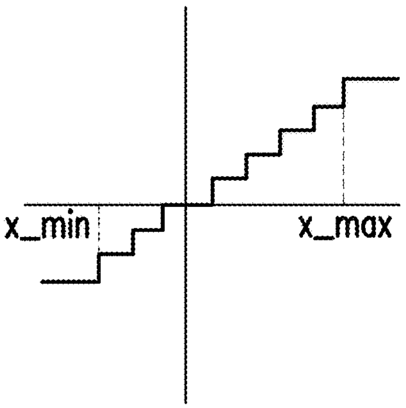
FIG. 10 is a schematic diagram of stepped quantization according to an embodiment of the disclosure.

On the other hand, FIG. 10 is a schematic diagram of stepped quantization according to an embodiment of the disclosure. Please refer to FIG. 10. A quantization equation is usually stepped. Values at the same level between a maximum value x_max and a minimum value x_min are quantized to the same value. However, with the neural network training of stepped quantization, parameters may not be updated due to zero gradient, which makes it difficult to learn. Therefore, there is a need to improve the gradient of the quantization equation.

Figure 11:
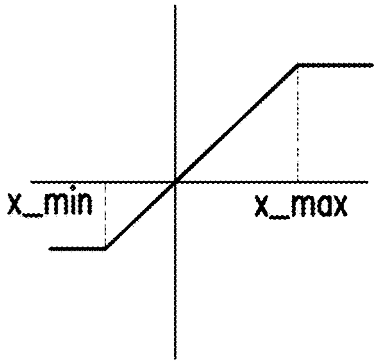
FIG. 11 is a schematic diagram of a straight through estimator (STE) with boundary constraint according to an embodiment of the disclosure.

A straight through estimator (STE) may be used to approximate the gradient of the quantization equation. In an embodiment, the processor 150 may use the straight through estimator (STE) with boundary constraint to further mitigate gradient noise. FIG. 11 is a schematic diagram of a straight through estimator with boundary constraint (STEBC) according to an embodiment of the disclosure. Please refer to FIG. 11. The STEBC can prevent the differentiation of the quantization equation and determine the quantization equation with an input gradient equal to an output gradient. Equation (8) may express the STEBC as:

$$\frac{\partial y}{\partial x_i^R} = \begin{cases} \frac{\partial y}{\partial x_i^Q}, & \text{if } lb \le x_i^R \le ub \\ 0, & \text{otherwise} \end{cases} \tag{8}$$

$$ub = (-1)^0 \times x^{-fl} \times \sum_{i=0}^{B-2} 2^i \tag{9}$$

$$lb = (-1)^1 \times x^{-fl} \times \sum_{i=0}^{B-2} 2^i \tag{10}$$

where lb is the bottom limit, ub is the upper limit, fl is the fraction length, R is the real number, Q is the quantized number, $$x_i^R$$

is the value of the real number (that is, the unquantized value), $$x_i^Q$$

is the quantized value, y is the output activation/feature value, and B is the bit width. If the value $$x_i^R$$

is in a limit range [lb, ub] between the upper limit and the bottom limit, the processor 150 may equate a real gradient $$\frac{\partial y}{\partial x_i^R}$$

thereof to a quantization gradient $$\frac{\partial y}{\partial x_i^Q}.$$

However, if the value $$x_i^R$$

is outside the limit range [lb, ub], the processor 150 may ignore the gradient thereof and directly set the quantization gradient to zero.

Figure 12:
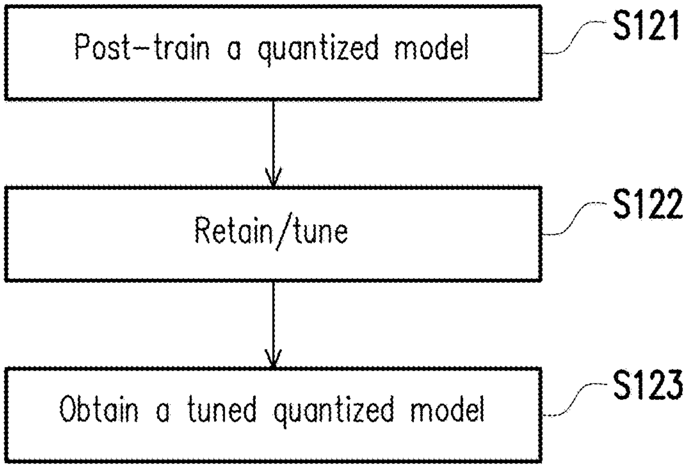
FIG. 12 is a flowchart of model correction according to an embodiment of the disclosure.

FIG. 12 is a flowchart of model correction according to an embodiment of the disclosure. Please refer to FIG. 12. A quantized model may be obtained after quantizing the parameters in the pre-trained model. For example, the weight, the input activation/feature value, and/or the output activation/feature value of each layer in the deep learning network is quantized. In an embodiment, in addition to using different quantization parameters for different sections of the same parameter type, the processor 150 may use different quantization parameters for different parameter types. Taking AlexNet as an example, the range of the parameter type weight is $[2^{-11}, 2^{-3}]$, and the range of the parameter type activation/feature value is $[2^{-2}, 2^{8}]$. If a single quantization parameter is used to cover the two ranges, a greater bit width may be required to represent the values. Therefore, different quantization parameters may be assigned to the ranges of different parameter types.

In an embodiment, multiple quantization layers are added to the deep learning network. The quantization layers may be divided into three parts for the weight, the input activation/feature value, and the output activation/feature value. In addition, different or identical bit widths and/or fraction lengths may be respectively provided to represent the values of the three parts of the quantization layers. Thereby, the layer-by-layer level quantization layer can be achieved.

Figure 13:
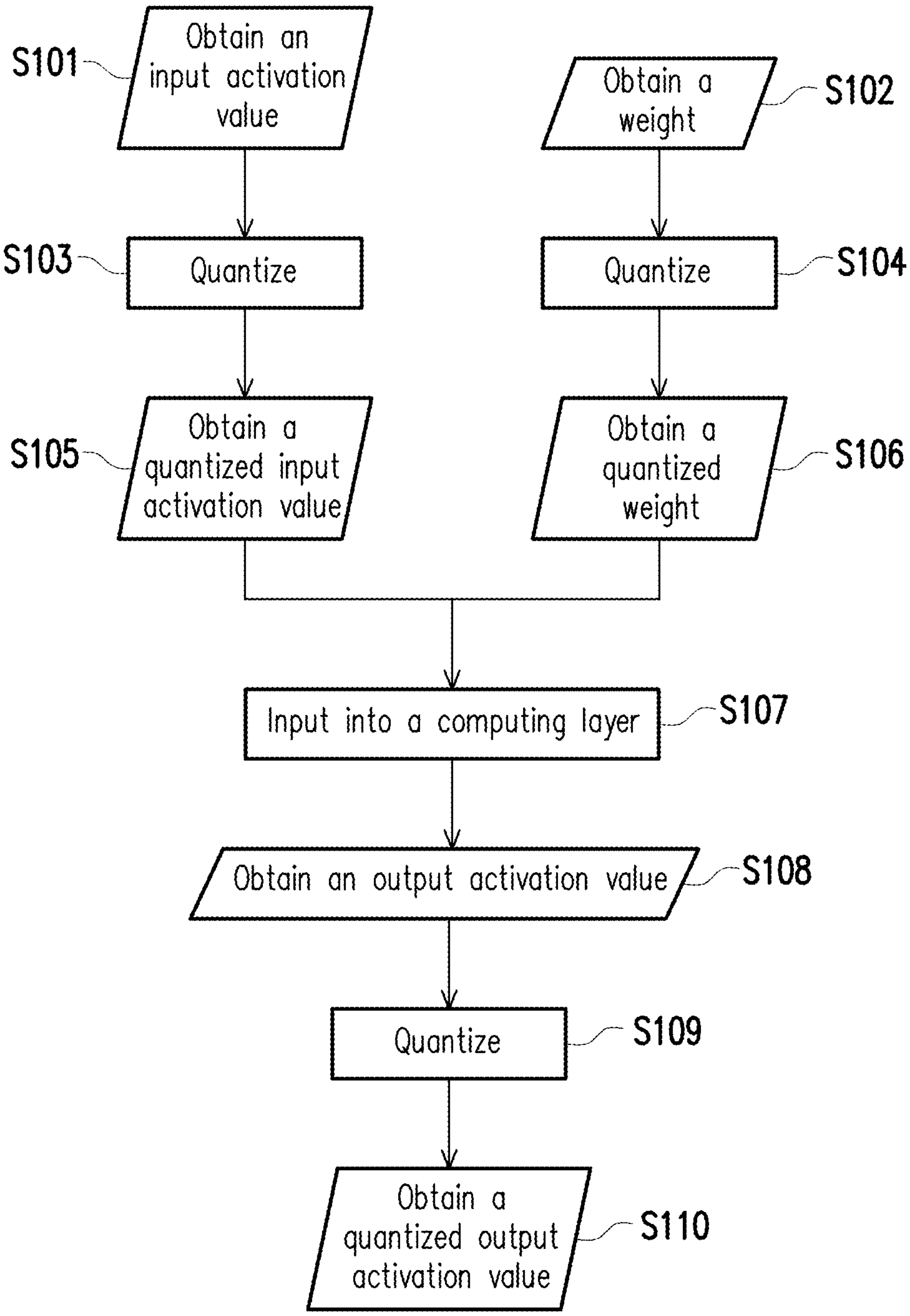
FIG. 13 is a flowchart of a layer-by-layer level quantization layer according to an embodiment of the disclosure.

FIG. 13 is a flowchart of a layer-by-layer level quantization layer according to an embodiment of the disclosure. Please refer to FIG. 13. The processor 150 may obtain input activation/feature values and weights (taking floating points as an example) of a parameter type (Steps S101 and S102), and respectively quantize values of the weights or the input activation/feature values (Steps S103 and S104) (for example, the dynamic fixed-point quantization, the asymmetric quantization, or other quantization methods) to obtain quantized input activation/feature values and quantized weights (Steps S105 and S106). The processor 150 may input the quantized values into a computing layer (Step S107). The computing layer executes, for example, convolution computation, fully-connected computation, or other computations. Next, the processor 150 may obtain output activation/feature values of the parameter type output by the computing layer (Step S108), quantize values of the output activation/feature values (Step S109), and obtain quantized output activation/feature values accordingly (Step S110). The quantization Steps S103, S104, and S109 may be regarded as for a quantization layer. The mechanism may connect the quantization layer to a general floating-point layer or a customized layer. Additionally, in some embodiments, the processor 150 may use a floating-point general matrix multiplication (GEMM) library (for example, a compute unified device architecture (CUDA)) to accelerate training and inference processing.

Figure 14:
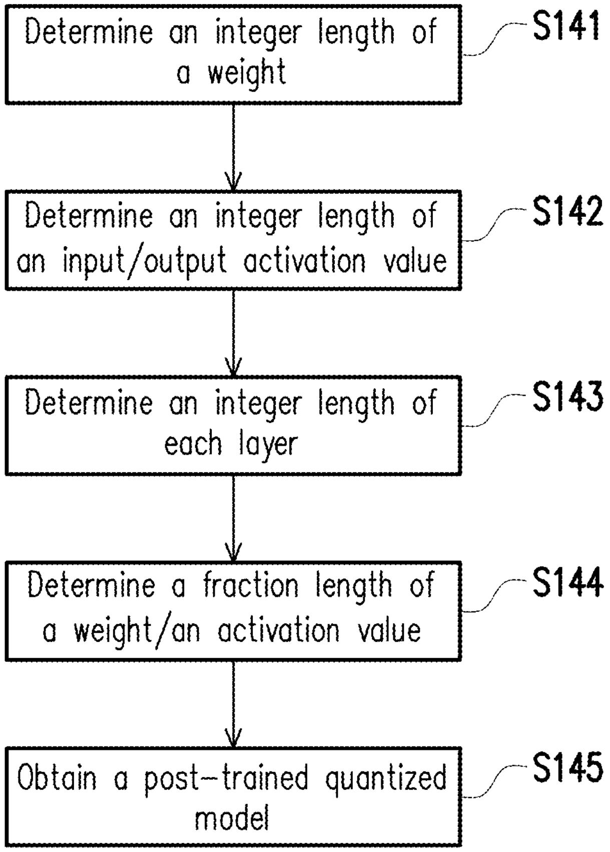
FIG. 14 is a flowchart of layer-by-layer post-training quantization according to an embodiment of the disclosure.

The processor 50 may post-train the quantized model (Step S121). For example, the quantized model is trained using training samples with labeled results. FIG. 14 is a flowchart of layer-by-layer post-training quantization according to an embodiment of the disclosure. Please refer to FIG. 14. The processor 150 may determine the integer length of the weight of each quantization layer in the quantized model using, for example, percentile clipping or a multi-scale quantization method on the trained weight (Steps S141 and S143). For the example of percentile clipping, reference may be made to the related description of Equation (5), which will not be repeated here. Then, the processor 150 may infer multiple calibration samples according to the quantized model to determine the value distribution of the input/output activation/feature values in each quantization layer in the quantized model, and select the maximum for the clipping method accordingly. The processor 150 may determine the integer length of the activation/feature value in each quantization layer in the quantized model using, for example, the absolute maximum value or the multi-scale quantization method on the trained input/output activation/feature value (Steps S142 and S143). For the example of the absolute maximum value, reference may be made to the related descriptions of Equations (6) and (7), which will not be repeated here.

Next, the processor 150 may determine the fraction length of the values/activation/feature value of each quantization layer according to a bit width limit of each quantization layer (Step S144). Equation (11) is used to determine the fraction length as follows:

$$FL = BW - IL \tag{11}$$

where FL is the fraction length, BW is the predefined bit width limit, and IL is the integer length. Under some application scenarios, the integer length obtained from Equation (11) may be less than the integer length obtained from Equations (5) to (7), for example, by one bit. (Fine-)tuning the integer length helps to improve prediction accuracy of a model. Finally, the processor 150 may obtain a post-trained quantized model (Step S145).

Please refer to FIG. 12. The processor 150 may retrain/(fine-)tune the trained quantized model (Step S122). Under some application scenarios, post-training a trained model may reduce prediction accuracy. Therefore, accuracy can be improved through (fine-)tuning. In an embodiment, the processor 150 may determine the gradient of quantization of weight by using the straight through estimator with boundary constraint (STEBC). The straight through estimator is configured such that the input gradient between the upper limit and the bottom limit is equal to the output gradient. As previously explained, the straight through estimator with boundary constraint can improve gradient approximation. The embodiment of the disclosure introduces the straight through estimator with boundary constraint for a single layer in the deep learning network and provides layer-by-layer level (fine-)tuning. In other words, in addition to providing layer-by-layer quantization for forward propagation, layer-by-layer (fine-)tuning may also be provided in backward propagation. For layer-by-layer quantization of forward propagation, reference may be made to the relevant description of FIG. 13, which will not be repeated here.

Figure 15:
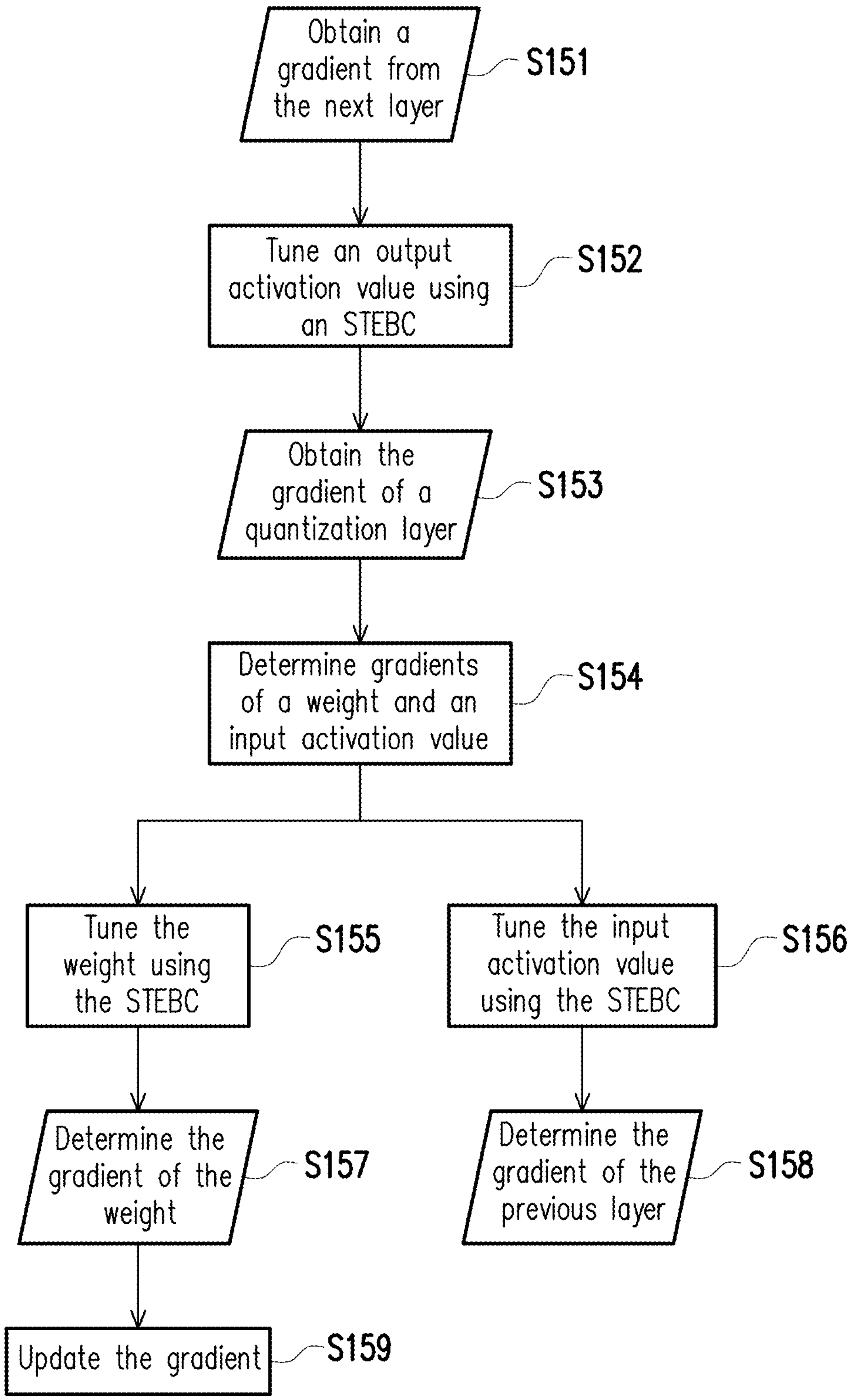
FIG. 15 is a flowchart of model fine-tuning according to an embodiment of the disclosure.

FIG. 15 is a flowchart of model fine-tuning according to an embodiment of the disclosure. Please refer to FIG. 15. For the trained quantized model, in backward propagation, the processor 150 may obtain the gradient from the next layer (Step S151), and (fine-)tune the gradient of an output activation/feature value using the straight through estimator with boundary constraint (Step S152) to obtain the gradient of the output of the quantization layer (Step S153). It should be noted that taking neural network inference as an example, forward propagation starts from an input layer of the neural network and sequentially towards an output layer thereof. In terms of the adjacent layers before and after one of the layers, the layer closer to the input layer is the previous layer, and the layer closer to the output layer is the next layer. In addition, the processor 150 may determine corresponding gradients from a weight and an input activation/feature value of the trained quantized model using floating-point computation (Step S154), respectively (fine-)tune the gradients of the weight and the input activation/feature value using the straight through estimator with boundary constraint (Steps S155 and S156), and determine the gradient of the weight and the gradient for the previous layer accordingly (Steps S157 and S158). Next, the processor 150 may update the weights using a gradient decent method (Step S159). The weight may be used, for example, in Step S102 of FIG. 13. It is worth noting that the updated gradient may still be applied to floating-point quantization. Finally, the processor 150 may obtain a (fine-)tuned quantized model (Step S123). Thereby, prediction accuracy can be further improved.

An embodiment of the disclosure further provides a non-transitory computer-readable storage medium (for example, a hard disk drive, an optical disk, a flash memory, a solid state drive (SSD), and other storage media) and is used to store a code. The processor 150 or other processors of the computing apparatus 100 may load the code, and execute the corresponding process of one or more optimizing methods according to the embodiments of the disclosure. For the processes, reference may be made to the above descriptions, which will not be repeated here.

In summary, in the optimizing method and the computing apparatus for the deep learning network and the computer-readable storage medium according to the embodiments of the disclosure, the value distribution of the parameters of the pre-trained model is analyzed, and the range is determined to be divided into the breaking points with different quantization requirements. The breaking point may divide the value distribution of different parameter types into multiple sections and/or divide the value distribution of a single parameter type into multiple sections. Different quantization parameters are respectively used for different sections. The percentile clipping method is used to determine the integer length of the weight, and the absolute maximum method is used to determine the integer length of the input/output feature/activation value. In addition, the straight through estimator with boundary constraint is introduced to improve gradient approximation. In this way, accuracy drop can be reduced and allowable compression can be achieved.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A processor-implemented method performed by a processor for a deep learning network, comprising:

generating a value distribution from a pre-trained model by performing inference on verification data through the pre-trained model and counting each of values of a parameter type at each layer in the deep learning network, wherein the pre-trained model is a model trained by inputting training samples into the deep learning network, the value distribution is a statistical distribution of the values of the parameter type in the deep learning network, and the parameter type is one of a weight, an input activation, an output activation, an input feature value, and an output feature value;

searching at least one breaking point in a range of the value distribution by comparing a variance between a value before quantization and a corresponding value after quantization of a search point with another variance of another search point in the range of the value distribution, wherein the range is divided into a plurality of sections by the at least one breaking point;

quantizing on a part of the values of the parameter type in a first section among the sections using a first quantization parameter and the other part of the values of the parameter type in a second section among the sections using a second quantization parameter comprising performing dynamic fixed-point quantization combined with a clipping method, wherein the first quantization parameter is different from the second quantization parameter, the first quantization parameter and the second quantization parameter have different integer lengths in the dynamic fixed-point quantization, the integer length of the first quantization parameter is determined according to an absolute value of a maximum value and an absolute value of a minimum value in the value distribution, and the maximum value and the minimum value are determined by the clipping method;

obtaining a quantized model after quantizing the values of the parameter type in the pre-trained model;

post-training the quantized model by training with training samples having labeled results for obtaining a trained quantized model; and tuning the trained quantized model, comprising:

determining a gradient of the weight of the parameter type of the trained quantized model using floating-point computation;

respectively tuning the gradient of the weight of the parameter type of the trained quantized model by using a straight through estimator with boundary constraint (STEBC), wherein the straight through estimator determines an input gradient between an upper limit and a bottom limit is equal to an output gradient; and obtaining a tuned quantized model with the tuned gradient of the weight of the parameter type.

2. The processor-implemented method for the deep learning network according to claim 1, wherein the searching the at least one breaking point in the range of the value distribution comprises:

determining a plurality of first search points in the range;

respectively dividing the range according to the first search points for forming a plurality of evaluation sections, and each of the evaluation sections corresponding to each of the first search points;

respectively performing quantization on the evaluation sections of each of the first search points according to different quantization parameters for obtaining a quantized value corresponding to each of the first search points; and comparing a plurality of variance amounts of the first search points for obtaining the at least one breaking point, wherein each of the variance amounts corresponding to one of the first search points comprises a variance between a quantized value and a corresponding unquantized value.

3. The processor-implemented method for the deep learning network according to claim 2, wherein the comparing the variance amounts of the first search points for obtaining the at least one breaking point comprises:

using one of the first search points with a first variance amount as the at least one breaking point, wherein the first variance amount has variance amount that is smaller than others of the variance amounts of the first search points.

4. The processor-implemented method for the deep learning network according to claim 2, wherein the determining the first search points in the range comprises:

determining a first search space in the range, wherein the first search space is equally divided into the evaluation sections by the first search points.

5. The processor-implemented method for the deep learning network according to claim 4, wherein the comparing the variance amounts of the first search points for obtaining the at least one breaking point comprises:

determining a second search space according to one of the first search points with a first variance amount, wherein the second search space is less than the first search space, and the first variance amount has variance amount that is smaller than others of the variance amounts of the first search points;

determining a plurality of second search points in the second search space, wherein a distance between adjacent two of the second search points is less than a distance between adjacent two of the first search points; and comparing a plurality of variance amounts of the second search points for obtaining the at least one breaking point, wherein each of the variance amounts corresponding to one of the second search points comprises a variance between a quantized value and a corresponding unquantized value.

6. The processor-implemented method for the deep learning network according to claim 5, wherein the determining the second search space according to one of the first search points with the first variance amount comprises:

determining a breaking point ratio according to one of the first search points with the first variance amount, wherein the breaking point ratio is a ratio of the one of the first search points with the first variance amount to a maximum absolute value in the value distribution; and determining the second search space according to the breaking point ratio, wherein the first variance amount is located in the second search space.

7. The processor-implemented method for the deep learning network according to claim 1, further comprising:

quantizing a value of a weight or an input activation value of the parameter type;

inputting a quantized value into a computing layer; and quantizing a value of an output activation value of the parameter type output of the computing layer.

8. The processor-implemented method for the deep learning network according to claim 1, wherein the post-training the quantized model comprises:

determining an integer length of a weight of each of a plurality of quantization layers in the quantized model;

inferring a plurality of calibration samples according to the quantized model to determine an integer length of an activation/feature value in each of the quantization layers in the quantized model; and determining a fraction length of each of the quantization layers according to a bit width limit of each of the quantization layers.

9. A computing apparatus for a deep learning network, comprising:

a memory, for storing a code; and a processor, coupled to the memory, for loading and executing the code to:

generate a value distribution from a pre-trained model by performing inference on verification data through the pre-trained model and counting each of values of a parameter type at each layer in the deep learning network, wherein the pre-trained model is a model trained by inputting training samples into the deep learning network, the value distribution is a statistical distribution of the values of the parameter type in the deep learning network, and the parameter type is one of a weight, an input activation, an output activation, an input feature value, and an output feature value;

search at least one breaking point in a range of the value distribution by comparing a variance between a value before quantization and a corresponding value after quantization of a search point with another variance of another search point in the range of the value distribution, wherein the range is divided into a plurality of sections by the at least one breaking point;

quantize on a part of the values of the parameter type in a first section among the sections using a first quantization parameter and the other part of values of the parameter type in a second section among the sections using a second quantization parameter comprising performing dynamic fixed-point quantization combined with a clipping method, wherein the first quantization parameter is different from the second quantization parameter, the first quantization parameter and the second quantization parameter have different integer lengths in the dynamic fixed-point quantization, the integer length of the first quantization parameter is determined according to an absolute value of a maximum value and an absolute value of a minimum value in the value distribution, and the maximum value and the minimum value are determined by the clipping method;

obtain a quantized model after quantizing the values of the parameter type in the pre-trained model;

post-train the quantized model by training with training samples having labeled results for obtaining a trained quantized model; and tune the trained quantized model, comprising:

determine a gradient of the weight of the parameter type of the trained quantized model using floating-point computation;

respectively tune the gradient of the weight of the parameter type of the trained quantized model by using a straight through estimator with boundary constraint (STEBC), wherein the straight through estimator determines an input gradient between an upper limit and a bottom limit is equal to an output gradient; and obtain a tuned quantized model with the tuned gradient of the weight of the parameter type.

10. The computing apparatus for the deep learning network according to claim 9, wherein the processor further:

determines a plurality of first search points in the range;

respectively divide the range according to the first search points for forming a plurality of evaluation sections, and each of the evaluation sections corresponding to each of the first search points;

respectively performs quantization on the evaluation sections of each of the first search points according to different quantization parameters for obtaining a quantized value corresponding to each of the first search points; and compares a plurality of variance amounts of the first search points for obtaining the at least one breaking point, wherein each of the variance amounts corresponding to one of the first search points comprises a variance between a quantized value and a corresponding unquantized value.

11. The computing apparatus for the deep learning network according to claim 10, wherein the processor further:

uses one of the first search points with a first variance amount as the at least one breaking point, wherein the first variance amount has variance amount that is smaller than others of the variance amounts of the first search points.

12. The computing apparatus for the deep learning network according to claim 10, wherein the processor further:

determines a first search space in the range, wherein the first search space is equally divided into the evaluation sections by the first search points.

13. The computing apparatus for the deep learning network according to claim 12, wherein the processor further:

determines a second search space according to one of the first search points with a first variance amount, wherein the second search space is less than the first search space, and the first variance amount has variance amount that is smaller than others of the variance amounts of the first search points;

determines a plurality of second search points in the second search space, wherein a distance between adjacent two of the second search points is less than a distance between adjacent two of the first search points; and compares a plurality of variance amounts of the second search points for obtaining the at least one breaking point, wherein each of the variance amounts corresponding to one of the second search points comprises a variance between a quantized value and a corresponding unquantized value.

14. The computing apparatus for the deep learning network according to claim 13, wherein the processor further:

determines a breaking point ratio according to one of the first search points with the first variance amount, wherein the breaking point ratio is a ratio of the one of the first search points with the first variance amount to a maximum absolute value in the value distribution; and determines the second search space according to the breaking point ratio, wherein the first variance amount is located in the second search space.

15. The computing apparatus for the deep learning network according to claim 9, wherein the processor further:

quantizes a value of a weight or an input activation/feature value of the parameter type;

inputs a quantized value into a computing layer; and quantizes a value of an output activation value of the parameter type output by the computing layer.

16. A non-transitory computer-readable storage medium, for storing a code, wherein a processor loads the code to execute:

generating a value distribution from a pre-trained model by performing inference on verification data through the pre-trained model and counting each of values of a parameter type at each layer in the deep learning network, wherein the pre-trained model is a model trained by inputting training samples into the deep learning network, the value distribution is a statistical distribution of the values of the parameter type in the deep learning network, and the parameter type is one of a weight, an input activation, an output activation, an input feature value, and an output feature value;

searching at least one breaking point in a range of the value distribution, by comparing a variance between a value before quantization and a corresponding value after quantization of a search point with another variance of another search point in the range of the value distribution, wherein the range is divided into a plurality of sections by the at least one breaking point;

quantizing on a part of the values of the parameter type in a first section among the sections using a first quantization parameter and the other part of the values of the parameter type in a second section among the sections using a second quantization parameter comprising performing dynamic fixed-point quantization combined with a clipping method, wherein the first quantization parameter is different from the second quantization parameter, the first quantization parameter and the second quantization parameter have different integer lengths in the dynamic fixed-point quantization, the integer length of the first quantization parameter is determined according to an absolute value of a maximum value and an absolute value of a minimum value in the value distribution, and the maximum value and the minimum value are determined by the clipping method;

obtaining a quantized model after quantizing the values of the parameter type in the pre-trained model;

post-training the quantized model by training with training samples having labeled results for obtaining a trained quantized model; and tuning the trained quantized model, comprising:

determining a gradient of the weight of the parameter type of the trained quantized model using floating-point computation;

respectively tuning the gradient of the weight of the parameter type of the trained quantized model by using a straight through estimator with boundary constraint (STEBC), wherein the straight through estimator determines an input gradient between an upper limit and a bottom limit is equal to an output gradient; and obtaining a tuned quantized model with the tuned gradient of the weight of the parameter type.

* * * * *